Feb. 19, 1952 S. SAKOLS 2,586,723
ILLUMINATED MAGNIFYING LENS
Filed Sept. 25, 1948

Inventor
Sidney Sakols
By J. Wesley Everett
Attorney

Patented Feb. 19, 1952

2,586,723

UNITED STATES PATENT OFFICE 2,586,723

ILLUMINATED MAGNIFYING LENS

Sidney Sakols, Baltimore, Md.

Application September 25, 1948, Serial No. 51,231

1 Claim. (Cl. 88—39)

The present invention relates in general to reading lenses and in particular to a lens constructed of a plastic material such as cellulose acetate or preferably of a polymerized derivative of methacrylic acid commercially known as "Lucite" which has the properties to direct a concentrated beam of light longitudinally therethrough. It is, therefore, contemplated to utilize these properties in the construction of an improved reading lens.

There are, at the present time, many types of reading, or magnifying, lenses in use including various types of supports and means for lighting the material to be observed; however, the present device is believed to be a substantial improvement over these present forms for certain specific uses.

The primary object of the invention is to provide a reading lens in which a plastic material is used having the properties of directing light longitudinally therethrough in combination with a light source and means for concentrating the light within the main magnifying area of the lens.

Another object is to provide such a lens which may be easily and readily attached to an ordinary flashlight.

Still another object is to provide a reading lens that may be readily carried in a hand bag, or pocket, which will not be too heavy or burdensome and which would be free from mechanical defects.

Such a reading lens would have numerous uses and advantages over the present type, such as, reading programs in theaters when the lights are off, reading thermometers, charts and the like in hospitals where the light is usually very dim. It would be especially useful in reading maps at night, particularly for the military when the use of lights is prohibited.

While several objects, uses, and advantages of the device have been pointed out, others may become apparent as the nature of the device is described more in detail, which consists in the novel construction, combination and arrangement of parts shown in the accompanying drawings and described in the following detailed description showing the device in its preferred form embodying the invention and in which.

Figure 1:
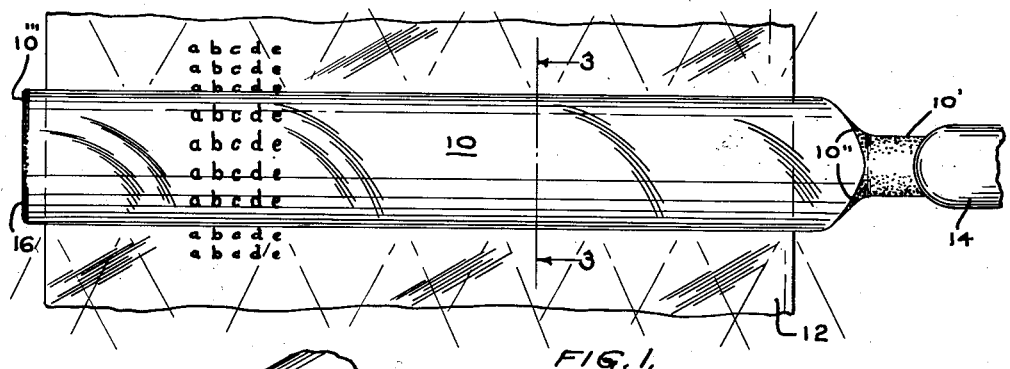
Figure 1 is a fragmentary plan view of the device.
Figure 2:
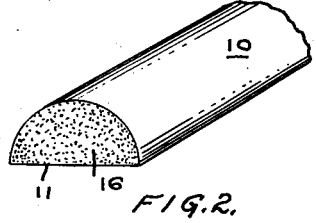
Figure 2 is a fragmentary perspective view of the outer end of the lens.
Figure 3:
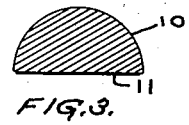
Figure 3 is a sectional view taken on the line 3—3 of Figure 1.
Figure 6:
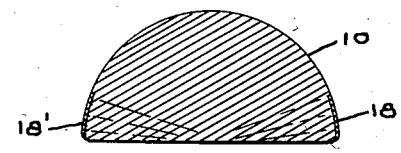
Figure 6 is a sectional view similar to Figure 3 of an enlarged modified form of the invention.
Figure 5:
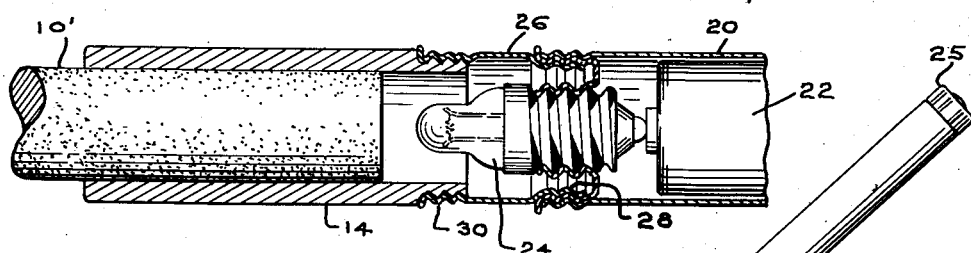
Figure 5 is a fragmentary sectional view on the line 5—5 of Figure 4.
Figure 4:
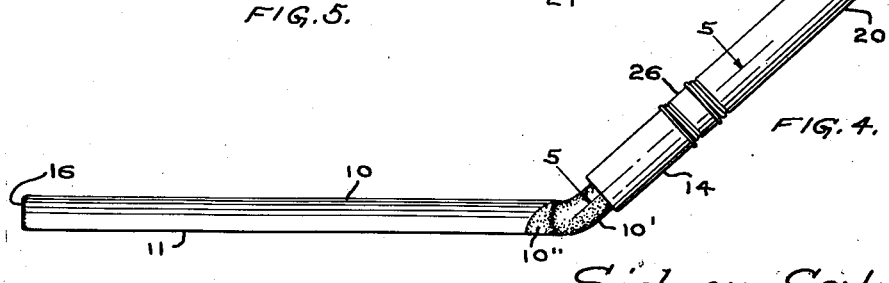
Figure 4 is a side elevation of the device.

Referring now to the drawings, the numeral 10 identifies generally an elongated reading lens which is made from a cellulose acetate plastic having the properties of directing a concentrated beam of light longitudinally thereof. The shape of the lens in cross-section is substantially semi-circular being flat on its bottom side and in the form of a semi-circle on its upper surface, the flat side being adapted to rest upon the paper, or material, 12 as shown in Figure 1. The length of the lens is not fixed and may be of the length best suited for the particular case for which it is intended to be used. The lens has formed preferably at one end a neck-like piece 10' which is bent in an upward and outward direction of approximately 45 degrees as shown in Figure 4. This portion 10' is adapted to receive a coupling 14. The opposite end 10" of the lens is provided with a reflector 16 for reflecting the light which reaches the opposite end of the lens back toward the main body, or magnifying portion, 10. Also a similar reflecting covering is placed about the neck portion 10' and the portion 10" of the lens to reflect any light rays reaching these surfaces to the magnifying area 10 of the lens.

A cross-section of a modified form of lens is shown with thin mirrors 18 and 18', or a reflector coating along the longitudinal edges of the lens. These reflectors are for the same purpose as the end reflectors, that is, to reflect the light that may reach the surfaces in these areas and reflect it back toward the center of the lens.

In order to light the lens, one or both ends of the lens is subjected to a light which is usually furnished from an electric bulb. For this purpose a hollow handle is provided capable of carrying a battery 22 and a small bulb 24 adjacent one end of the handle which may be turned off and on by any convenient switch mechanism, such as illustrated at 25.

Surrounding the bulb is a collar 26 having a thread 28 at one end for attaching it to the handle and a thread 30 for connecting it to the coupling 14. This collar 26 is not really necessary for the operation of the device as the member 14 may be secured directly to the handle. However, by using a collar such as 26 it affords protection for the bulb when the lens is detached. The collar also may be utilized to support the bulb. The lens may be provided with an adapter for connecting the lens with a standard flashlight holder.

In operation the light may or may not be used, it depends upon how much available light is already present. The lens is placed with its flat side adjacent the paper, or object to be read, as shown in Figure 1, and moved along the paper as desired by the handle 20. When not in use the handle may be disconnected by unscrewing the member 14 from the collar 24, or the handle 20 if the collar is not used.

While the lighting of the lens is shown by use of a battery, it may also be accomplished by supplying current to the bulb by means of a light electric cord (not shown).

It is apparent that this device may have many and sundry uses in places where printing is small and lighting is poor.

The form of the invention is not to be limited to the exact arrangement of parts shown in the foregoing drawing and specification as various changes in the details of construction may be resorted to without departing from the spirit of the invention and only in so far as the invention has been particularly pointed out in the accompanying claim is the same to be limited.

I claim:

A reading lens composed of a light transferring plastic material and comprising a portion having a relatively narrow elongated magnifying element, said magnifying element having a flat bottom surface adapted to overlie the reading matter and a semi-circular upper surface, a light reflector extending throughout the length of the magnifying portion adjacent each side of the flat bottom surface, an integral neck portion extending outwards from one end of the magnifying portion and bent upwardly at an angle of approximately 45 degrees, a covering placed over the outer end of the magnifying portion and the neck portion for concentrating the light in the magnifying element, a coupling adapted to snugly fit over the upper end of the neck, the outer end of the coupling extending outwardly from the outer end of the neck, to provide a recess to receive the outer end of a lighting element, a collar threadably receivable on the outer end of the coupling, the opposite end of the collar having an inner and outer thread, the inner thread adapted to receive a light bulb and the outer thread adapted to receive a handle member.

SIDNEY SAKOLS.

REFERENCES CITED

The following references are of record in the file of this patent:

UNITED STATES PATENTS

| Number | Name | Date |
| --- | --- | --- |
| 2,057,807 | Whitmore | Oct. 20, 1936 |
| 2,151,573 | Stanley | Mar. 21, 1939 |
| 2,186,143 | Neugass | Jan. 9, 1940 |
| 2,240,402 | Joroslow | Apr. 29, 1941 |
| 2,247,258 | Shepard | June 24, 1941 |
| 2,316,301 | Ullman | Apr. 13, 1943 |
| 2,428,975 | Lamb | Oct. 14, 1947 |